United States Patent [19]
Garneau, Sr.

[11] 4,218,038
[45] Aug. 19, 1980

[54] MOLD FOR COMB

[76] Inventor: Norman M. Garneau, Sr., 596 Lancaster St., Leominster, Mass. 01453

[21] Appl. No.: 844,718

[22] Filed: Oct. 25, 1977

[51] Int. Cl.² .................. B29C 1/00; B29C 1/14; B29D 19/02
[52] U.S. Cl. .................................. 249/160; 425/805
[58] Field of Search ............ 132/109, 11 R, 120, 132/162; 264/138, 328, 145, 243, 271; 249/95, 129, 124, 125, 160, 123, 176, 141, 117; 15/105; 300/21; 425/805–806, 542, 572, 805.1

[56] References Cited
U.S. PATENT DOCUMENTS

| | | | |
|---|---|---|---|
| 1,092,882 | 4/1914 | Wieland | 425/805 |
| 1,092,884 | 4/1914 | Wieland | 425/805 |
| 2,349,977 | 5/1944 | Mazzoni | 425/805 |
| 2,457,440 | 12/1948 | Booth | 132/109 X |

*Primary Examiner*—W. E. Hoag
*Attorney, Agent, or Firm*—Norman S. Blodgett; Gerry A. Blodgett

[57] ABSTRACT

Comb having teeth with generally rectangular cross-sections and apparatus for making the same.

6 Claims, 11 Drawing Figures

MOLD FOR COMB

BACKGROUND OF THE INVENTION

Traditionally, hair combs have been made by molding them of hard rubber or plastic in a mold with a parting line which extends through the mid-plane of the comb. The tooth surfaces taper in either direction away from this parting line to permit the molded part to be drawn from the mold. The ridge that is thus formed on the surface of the tooth is considered undesirable by many barbers, even when the mold is perfectly formed. When the mold begins to wear, however, and the two halves of the mold are slightly out of registry, a burr is actually formed along the parting line. This burr is not only damaging to the hair, when the comb is drawn through it, but is capable of retaining dirt and organic matter and provide a perfect location for the growth of bacteria. Attempts to overcome this difficulty have been made, one solution being to form the comb as a solid element and then to use a rotary saw for cutting the teeth. Unfortunately, teeth that are cut in this way have surfaces which bear the saw tooth marks and other irregularities; they are just as objectionable as the parting line irregularity. Furthermore, since a great deal of hand work is required, such cut combs are quite expensive. These and other difficulties experienced with the prior art devices have been obviated in a novel manner by the present invention.

It is, therefore, an outstanding object of the invention to provide a comb whose teeth have smooth, flat surfaces.

Another object of this invention is the provision of a comb whose teeth have no irregularities due to the method of making.

A further object of the present invention is the provision of a comb whose teeth have smooth, flat parallel facing surfaces.

It is another object of the instant invention to provide a comb free of locations in which bacteria can grow.

A still further object of the invention is the provision of a method of making a comb which is free of manufacturing irregularities.

It is a further object of the invention to provide a apparatus for making a comb wherein no taper need be provided for drawing the teeth, so that the teeth can be formed with perfectly flat, smooth, parallel facing surfaces.

It is a still further object of the present invention to provide a method of forming a comb with rectangular teeth cross-section, wherein no secondary or or finishing operations need be performed.

SUMMARY OF THE INVENTION

In general, the invention consists of a comb having an elongated main body and having a plurality of teeth extending from the main body and lying in the same general plane. The cross-sectional shape of each tooth is rectangular and each tooth is provided with spaced, parallel long sides extending at right angles to the said plane. The surfaces of the tooth which are defined by the said long sides are perfectly smooth and flat.

The invention also consists of apparatus for making the comb, having a first and second mold half. The mold halves have facing flat parting line surfaces and each has a recess opening onto that surface. Spacer walls extend integrally from the recess of one mold half into the recess of the other mold half to contact the surface of the last-mentioned recess. Comb teeth are molded between these spacer walls and, because the walls have smooth, flat surfaces, the comb teeth are suitable formed.

Figure 1:
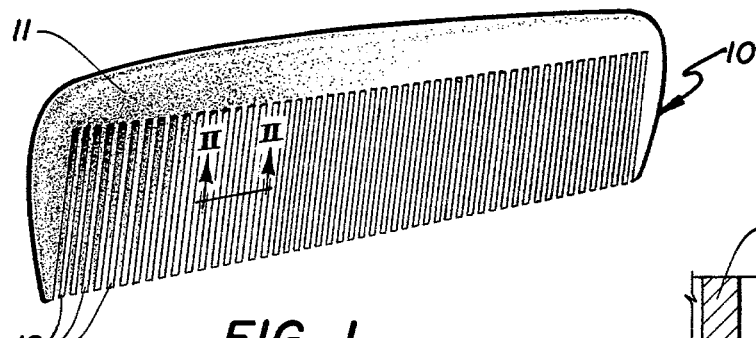
FIG. 1 is a perspective view of a comb embodying the principles of the present invention.

Referring first to FIG. 1, which best shows the general features of the invention, the comb, indicated generally by the reference numeral 10, is shown as consisting of an elongated main body 11 from which extends a plurality of teeth 12. These teeth lie in the same general plane.

Figure 2:
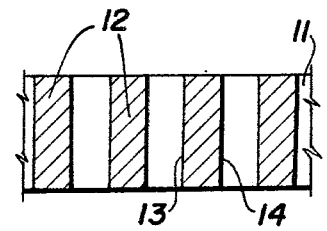
FIG. 2 is a sectional view of the comb taken on the line II—II of FIG. 1.

FIG. 2, which is a cross-sectional view of the invention, shows that the cross-sectional shape of each tooth 12 is rectangular with the spaced-parallel long sides 13 and 14 extending at right angles to the said plane. The surfaces of each tooth 12 (which are defined by the long sides of the rectangular cross-section) are characterized by being perfectly smooth and flat.

Figure 3:
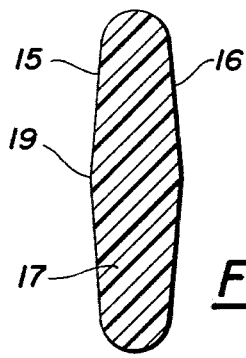
FIG. 3 is a cross-sectional view of a tooth of a prior art comb.

FIG. 3 is a cross-sectional view of a tooth 16 of a comb 15. The tooth 16 is provided with side surfaces 17 and 18 which extend angularly from a high point 19 along the center line of the comb.

Figure 4:
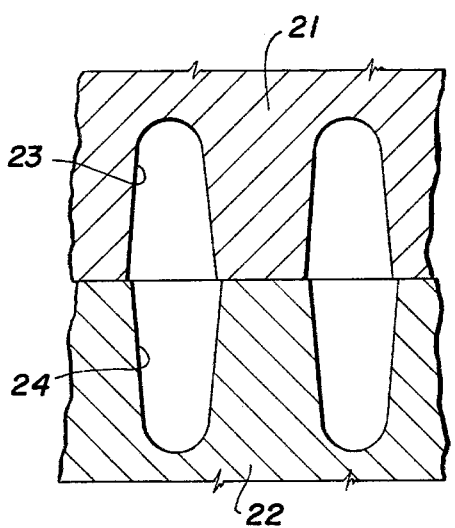
FIG. 4 is a sectional view of prior art molding apparatus for forming a comb.

FIG. 4 shows the manner in which this high point originates from the manufacture of the comb. The comb is injection molded in a mold having mold halves 21 and 22. Mold half 21 has a recess 23 opening onto the parting line or mating surface of two halves while the mold half 22 has a similar mirror image recess 24. The particular mold shown is in a worn condition, so that the recesses are slightly displaced laterally of one another thus molding the comb in which the high point 19 has a sharp high point 19 which may even have a slight reentrance angle which can damage hair and which can carry oil, grease, and bacteria. As shown by FIG. 4, the prior art mold forms each tooth with a recess on one mold half matched to a recess in another mold half.

Figure 7:
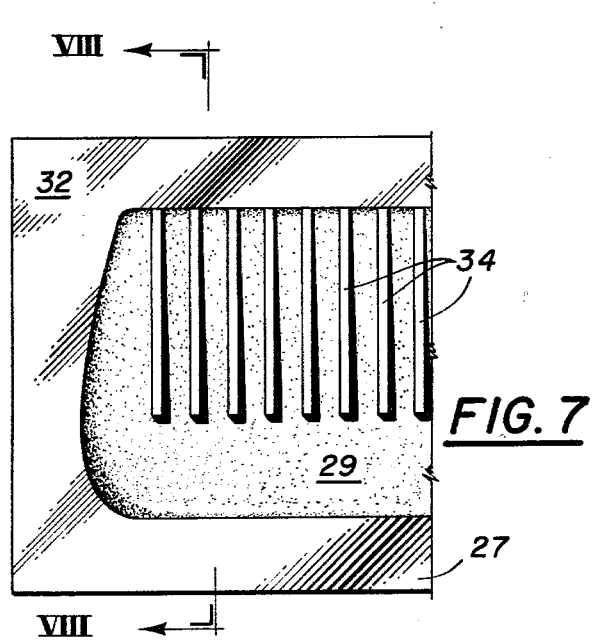
FIG. 7 is a front elevational view of a second mold half.
Figure 8:
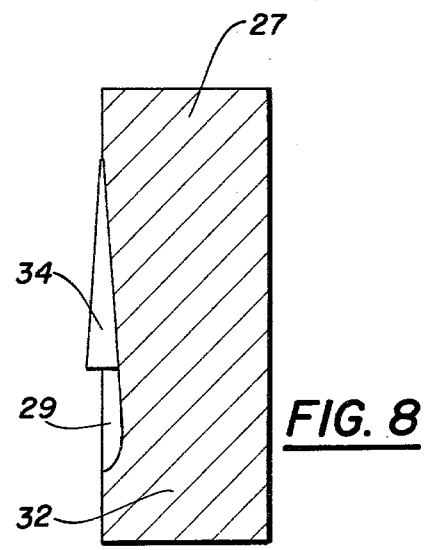
FIG. 8 is a vertical sectional view of the mold half taken on the line VIII—VIII of FIG. 7.

FIGS. 5, 6, 7, and 8 show the details of a mold apparatus consisting of a mold half 26 (FIGS. 5 and 6) and a mold half 27 (FIGS. 7 and 8). The first mold half 26 is provided with a parting line surface 31 onto which opens a recess 28. Similarly the second mold half 27 is provided with a recess 29 which opens on a parting line or flate surface 32. Extending from the recess 28 of the first mold half 26 is a plurality of spaced walls 33 which extend perpendicularly of the length of the recess and protrude from the recess past the face surface 31 and when the mold halves are joined together with the flat surfaces in contact, the outer edge of each of these walls contacts the surface of the opposed recess 29. Similar spaced walls 34 protrude from the recess 29 in the second mold half 27. These walls being suitable spaced to lie mid-way between the spaced walls 33 of the first mold half. These walls are similarly of such a length they contact the surface of the opposed recess 28 and form a seal therewith.

Figure 10:
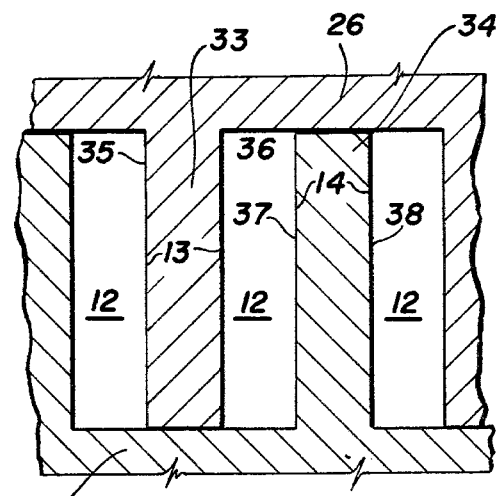
FIG. 10 is a horizontal sectional view of the molding apparatus somewhat enlarged to show detail.

It can be seen, then, that when the first mold half and the second mold half have their flat surfaces pressed together with recesses in registry they form a cavity for forming the comb and the spacer walls extend from the surface of each recess into contact with the surface of the opposite recess. This is clearly shown in FIG. 9 but change the lines from the FIGS. 31 and 32 in FIG. 9 to show them on the parting line. FIG. 10 shows the details of the mold with the plastic having been injected into it to form the comb. It can be seen that the spacer walls 33 and 34 have spaced, parallel flat surfaces 35 and 36 on the wall 33 and surfaces 37 and 38 on the wall 34. These surfaces define the spaces between the walls for forming the comb teeth of rectangular cross-section. These surfaces are smoothly polished to provide a similar high quality surface on the surface of comb teeth. For instance, it can be seen from FIG. 10 that the tooth 12 has its flat surface 13 define by the surface 36 of the wall 33, while the other surface 14 of the tube 12 is defined by the surface 37 of the wall 34. As is evident from the drawings, a portion of each of the recesses 28 and 29 is devoted to forming the elongated main body 11 or back of the comb 10. The second portion of the recess is devoted to the forming of teeth the second portion being tapered furthest away from the first portion and the spacer walls, of course, are similarly tapered to fit against their surface. Each spacer wall 33 and 34 has an outer edge which fits snugly against the tapered surface of the opposite recess and, of course, the spacer walls of the second mold half.

Figure 9:
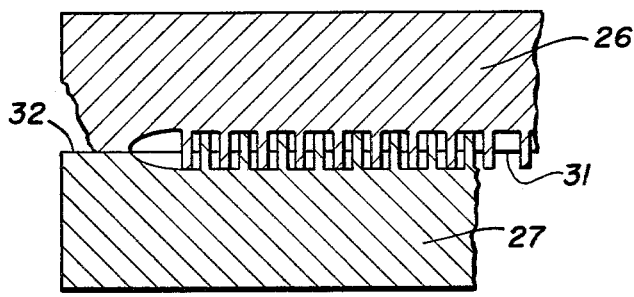
FIG. 9 is a horizontal sectional view of the apparatus showing both mold halves in closed position.

The operation of the apparatus and its advantages will now be readily understood in view of the above description. The mold halves 26 and 27 are brought together, so that their face surfaces 31 and 32 are tightly pressed together, as shown in FIG. 9. The apparatus is ready to receive the thermoplastic material for the formation of the comb 10. When the recesses have been completely filled with molten plastic and has cooled to a solid state, the comb is ready to remove from the molds. In the preferred embodiment this is done by retaining the mold half 26 is fixed position and drawing the mold half 27 away from it in a direction exactly perpendicular to the face surfaces and the parting line. This motion not only removes the recess surfaces of the mold half 27 away from the molded comb, but withdraws the spacer walls 34 from the molten comb. This allows the comb to remain behind in the mold half 26, so that the spaces between the teeth 12 of the comb are alternately occupied by a spacer wall 33 or a vacant space. This relieves the pressure on the teeth, so that it is a simple matter to actuate the knock-out pins which reside in the mold half 26, so that the comb is ejected.

Figure 11:
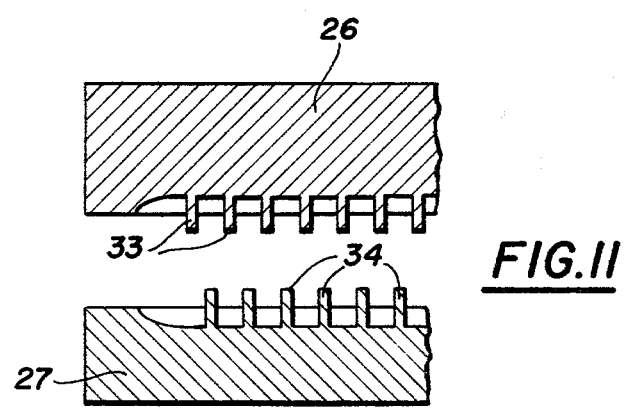
FIG. 11 is a horizontal sectional view of the molding apparatus showing the mold halves in open position.
Figure 5:
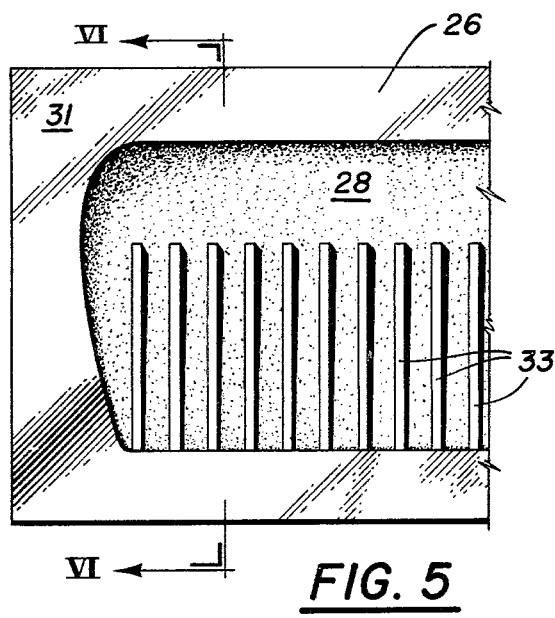
FIG. 5 is a front elevational view of a mold half of apparatus for forming the comb.
Figure 6:
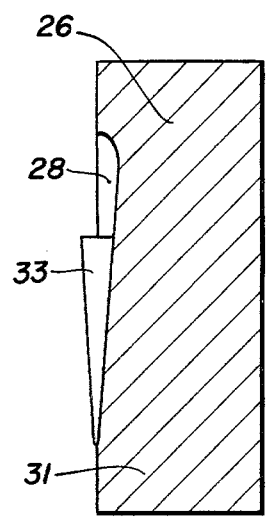
FIG. 6 is a vertical sectional view of the mold half taken on the line VI—VI of FIG. 5.

The fact that the surfaces of the spacer walls 33 and 34 are finely finished, means that the similar or corresponding surfaces of the comb teeth 12 are smoothly finished. There are no rough spots or lines to harbor organic material or bacteria. This would be true even when the mold becomes very worn, since the wear would take place in areas which would not effect the side surfaces of the teeth. Even when the molds are in perfect condition in the prior art, as is evident in FIG. 3, there is still the high point 19 due to the necessary taper in the teeth. An added benefit of the present invention, therefore, is that the molds may be used for a much greater length of time before it is necessary to replace them. The open position is, of course, shown in FIG. 11.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for molding a comb from plastic, comprising:
   (a) a first mold half having a first flat surface onto which opens a cavity for an elongated comb back,
   (b) a plurality of spaced walls perpendicular to the long direction of said cavity and protruding from the flat surface of the first mold half and having a space between each adjacent pair leading to the cavity, and
   (c) a second mold half similar to the first mold half having a second flat surface into which enters a cavity which is the mirror image of the first-mentioned cavity and having spaced walls that protrude beyond said second flat surface and are spaced from and lie between adjacent walls of the first mold half when the flat surfaces are in engagement, the walls being of such a length that the outer edges engage the surface of the opposing cavity to form a seal therewith, the spaces between the walls of one mold half and adjacent walls of the other mold half defining comb teeth forming cavities.

2. Apparatus for molding plastic comb, comprising:
   (a) a first mold half having a recess opening onto a flat face surface,
   (b) a second mold half having a recess opening onto a flat face surface, the recesses combining, when the flat surfaces are pressed together with the recesses in register, to form a cavity for forming the comb, and
   (c) a plurality of spacer walls extending from the surface of each recess, the walls of the first mold half being offset and spaced from the adjacent walls of the second mold half so that the ends of the walls extending from each recess are in contact with the surface of the opposite recess when the mold halves are together and the spaces between the walls of one mold half and adjacent walls of the other mold half define comb teeth forming cavities.

3. Apparatus as recited in claim 2, wherein the spacer walls from the first mold half alternate with the spacer walls of the second mold half.

4. Apparatus as recited in claim 2, wherein the spacer walls have spaced, parallel flat surfaces defining spaces between them for forming comb teeth of rectangular cross-section.

5. Apparatus as recited in claim 4, wherein a first portion of the cavity is devoted to forming an elongated main comb back and a second portion is intended to form teeth, the second portion being tapered to be shallow farthest away from the first portion, the spacer walls being similarly tapered.

6. Apparatus as recited in claim 5, wherein each tooth has a tapered outer edge which fits snugly against the tapered surface of the opposite recess.

* * * * *